Feb. 10, 1925.
W. A. DAVIS
1,525,723
ELECTRICALLY DRIVEN HAND OPERATED CIRCULAR SAW
Filed March 14, 1923
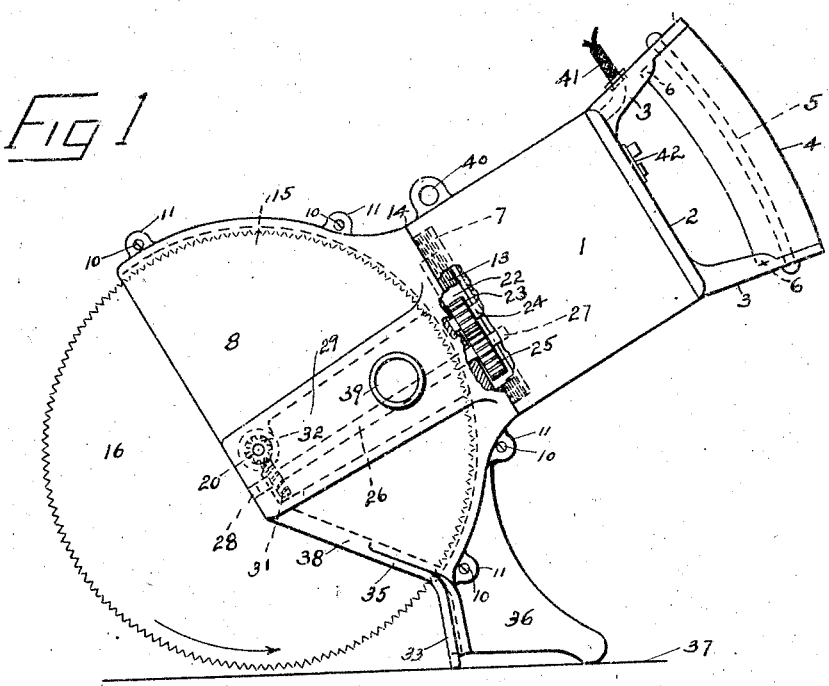
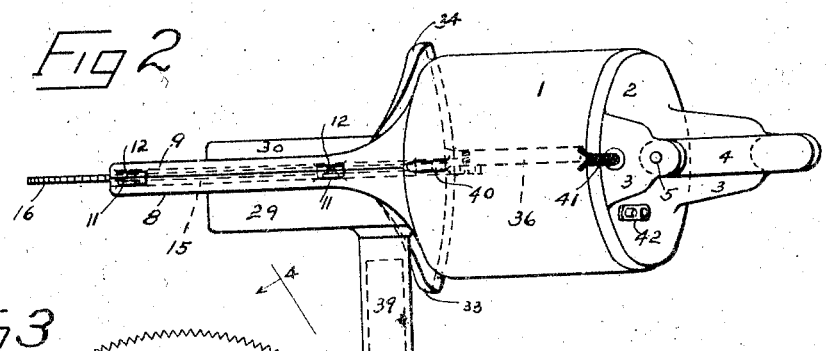
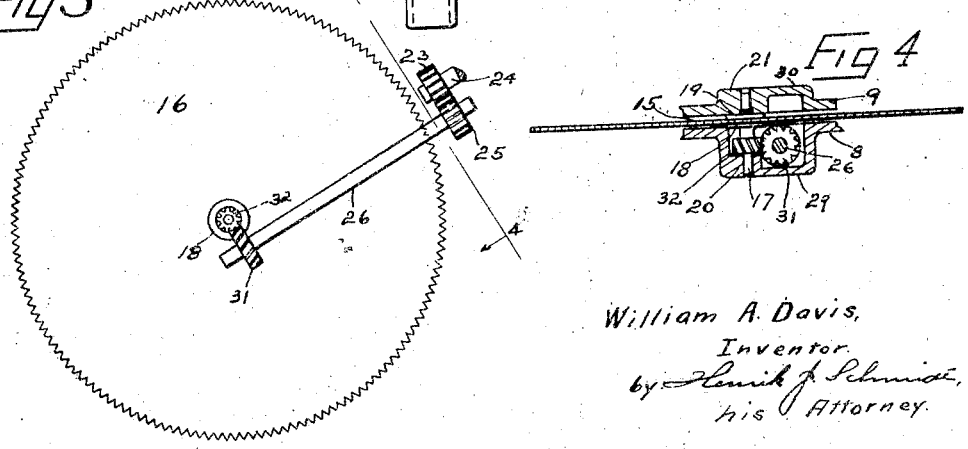
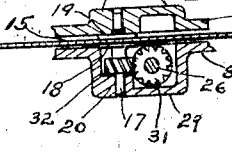
William A. Davis,
Inventor
by Henrik J. Schmidt,
his Attorney.

Patented Feb. 10, 1925.

1,525,723

UNITED STATES PATENT OFFICE.

WILLIAM A. DAVIS, OF JACKSONVILLE, FLORIDA.

ELECTRICALLY-DRIVEN HAND-OPERATED CIRCULAR SAW.

Application filed March 14, 1923. Serial No. 624,958.

*To all whom it may concern:*

Be it known that I, WILLIAM A. DAVIS, a citizen of the United States, residing at Jacksonville, in the county of Duval and State of Florida, have invented certain new and useful Improvements in Electrically-Driven Hand-Operated Circular Saws, of which the following is a specification.

My invention relates to portable, circular, power saws. The main and particular objects and advantages of the invention are, to provide a circular power saw which can be operated as a hand tool and which can be carried from place to place as needed.

A further object is to so construct the saw that it may be operated when held in either a vertical, horizontal or angular position. A still further object is to provide such a saw of simple and strong construction, of few parts, light in weight, easy to clean and take apart, easy and safe to operate, and comparatively inexpensive to manufacture.

These and various other objects and advantages will be clearly understood from the following specification and from the accompanying draw ; of a preferred embodiment of my invention, but it will be readily seen that various modifications might be made without departing from the scope of the invention.

Fig. 1 is a side elevation of the preferred embodiment, part being broken away to show the driving mechanism and the method of assembling the parts.

Fig. 2 is a top view of Fig. 1, several of the interior parts having been omitted to simplify the view.

Fig. 3 is a side view of the driving mechanism.

Fig. 4 is a view of the driving mechanism, taken on the line 4—4 Fig. 3, fragments of the bearing having been added in this view.

Referring now to all the views simultaneously, 1 is the electric motor which furnishes the power for operating the saw. This motor is of the enclosed type and has all its working parts contained within the body part or frame.

The end plate 2 is provided with two handle supports 3 in which the handle 4 is secured by means of the rivet 5. This handle is so located and shaped as to facilitate the handling of the tool and is prevented from rotating by its curved shape as well as by the sockets 6, formed in the handle supports 3. The opposite or lower end of the motor 1 is provided with an internally threaded recess 7.

The guard, in which the saw rotates, is made of two parts 8 and 9. These parts are held together by the screws 10 in lugs 11 and 12 and are also provided with an externally threaded stud 13 which screws into the recess 7, causing the shoulder 14 to abut against the end of the motor, thus securely attaching the guard to the motor.

A semicircular recess 15 is formed in the guard when the parts 8 and 9 are assembled; in this recess the circular saw 16 rotates. The saw is secured on the spindle 17 by being clamped between the collars 18 and 19; the collar 19 being threaded on the spindle so as to prevent the saw from rotating on the spindle. Bearings 20 and 21 are formed in the outer part of the guard and in these bearings the spindle 17 works.

The means employed for driving the saw will now be explained. A recess 22 is formed in the stud 13; this recess is circular and in it the main driving gears operate. A gear 23 is rigidly secured to the main shaft 24 of the motor. This gear drives another gear 25 which is rigidly mounted on the shaft 26. The shaft 26 rotates in bearing 27, formed in the motor 1, and in bearing 28, formed in the outer part of the guard part 8. The guard part 8 is provided with a hollow enlargement 29 in which the shaft 26 operates and in which the beari. gs 20 and 28 are located. An enlargement 30 is also provided on the guard part 9 and in this the bearing 21 is located. Near the lower end of shaft 26 a spiral gear 31 is rigidly mounted and this gear drives the spiral gear 32 attached on the spindle 17.

While the drawing shows the employment of spiral gears, it will be evident, to anybody skilled in the art, that a multiple threaded worm and a worm gear might be substituted At the lower part of the guard a shield is provided to catch the dust or particles thrown by the saw. This shield, which is formed by the parts 33 and 34 cast in one piece with the parts 8 and 9 respectively, is somewhat cupped and extends some distance along the sides of the guard, as plainly shown at 35 on Fig. 1. The saw always rotates in the direction indicated by the arrow. Beside acting as a shield, the parts 33 and 34 also act, in conjunction with part 36 which is also cast in one piece with part 9, as a three-footed stand. This stand, beside acting as a support for the tool, acts as a guide for sliding the tool over the bench on which it may be used. This is plainly shown in Fig. 1, where the line 37 represents the surface on which the stand slides.

To clean the saw as it revolves, strips, made of leather or other suitable material, are glued or otherwise secured at the lower edges of the guard; one of these strips is plainly shown, by the dotted line, at 38. These strips do not touch the saw but are set close to it. An extra handle 39 is provided so that, when necessary or convenient, the operator may use both hands. As it is sometimes advisable to suspend the tool by a counterweighted cord, the eye 40 is provided. 41 shows the wire for operating the motor and 42 the switch for starting and stopping it.

Having described my invention, what I claim as new and wish to protect by Letters Patent is:

1. In a tool of the class described; an electric motor; one end plate of said motor provided with an operating handle; the other end plate made integral with the saw guard and formed of two parts separated longitudinally with the axis of the motor and attached to same by means of a threaded shoulder screwed into a recess in said motor; bearings provided in said saw guard; a circular saw mounted on a suitable spindle rotating in said bearings; and means for imparting rotary motion from the motor to the saw.

2. In a tool of the class described; an electric motor; one end plate of said motor provided with an operating handle; the other end plate made integral with the saw guard and formed of two parts separated longitudinally with the axis of the motor and attached to same by means of a threaded shoulder screwed into a recess in said motor; bearings provided in said saw guard; a circular saw mounted on a suitable spindle rotating in said bearings; means for imparting rotary motion from the motor to the saw; and a stand formed on said saw guard, so constructed as to be perpendicularly under the center of gravity of the tool.

In testimony whereof, I, WILLIAM A. DAVIS, have signed my name to this specification in the presence of two subscribing witnesses, this 5th day of January, 1923.

WILLIAM A. DAVIS.

Witnesses:
HENRIK J. SCHMIDT.
AUG. J. HOCHSTRA.